United States Patent [19]

Bulusu

[11] Patent Number: 5,689,702
[45] Date of Patent: Nov. 18, 1997

[54] FLEXIBLE DATA STRUCTURE LAYOUT FOR DATA STRUCTURE INCLUDING BIT-FIELD DATA MEMBERS

[75] Inventor: Gopi Kumar Bulusu, Sunnyvale, Calif.

[73] Assignee: Microtec Research, Inc., Santa Clara, Calif.

[21] Appl. No.: 480,619

[22] Filed: Jun. 7, 1995

[51] Int. Cl.$^6$ .................................................. G06F 17/30
[52] U.S. Cl. ........................... 395/611; 395/612; 395/613; 395/614; 395/615
[58] Field of Search ............................... 395/700, 600, 395/611, 612, 613, 497.02, 404, 614, 615; 364/200, 900; 360/78.11

[56] References Cited

U.S. PATENT DOCUMENTS

| | | | |
|---|---|---|---|
| 4,366,537 | 12/1982 | Heller et al. | 364/200 |
| 4,430,705 | 2/1984 | Gannavino et al. | 364/200 |
| 4,499,539 | 2/1985 | Vosacek | 364/200 |
| 4,882,642 | 11/1989 | Tayler et al. | 360/78.11 |
| 4,994,998 | 2/1991 | Anezaki | 364/900 |
| 5,418,963 | 5/1995 | Anezaki et al. | 395/700 |
| 5,487,165 | 1/1996 | Tsay et al. | 395/600 |
| 5,504,891 | 4/1996 | Motoyama et al. | 395/600 |
| 5,506,985 | 4/1996 | Motoyama et al. | 395/600 |
| 5,535,369 | 7/1996 | Wells et al. | 395/497.02 |
| 5,546,575 | 8/1996 | Potter et al. | 395/600 |
| 5,596,736 | 1/1997 | Kerns | 395/404 |

OTHER PUBLICATIONS

Wagener, Principles of Programming (Fortran), Text Book, pp. 167-168, 262-276 1980.

Bijan, Programming Byte by Byte (Fortran), Text Book, pp. 540-543 Apr. 1984.

"The C programming Language 2nd Edition" by Kenighan et al. pp. 147-150, 185-189, 215-219.

"Teach Yourself C++ in 21 days" by Jessie Liberty 1st Edition pp. 37, 62, 586-610, 657-658, no date.

*Primary Examiner*—Thomas G. Black
*Assistant Examiner*—Frantz Coby
*Attorney, Agent, or Firm*—Gray Cary Ware & Freidenrich

[57] ABSTRACT

The invention produces data structure layout in a flexible manner that enables the data structures of a computer program to be layed out in a manner that conforms to constraints imposed by a particular computer system on which the program is implemented and that enables the produced data structure layout to be used with different computer systems having different constraints. Thus, the invention is particularly useful with systems that require close control of data structure layout and that have unique requirements for that layout. Embedded real-time systems, which are often implemented on hardware which is designed and optimized for a particular application, are one example of the type of system with which the invention can advantageously be used. The invention additionally allows a user to specify various parameters that control aspects of the manner in which data structure layout is achieved and, therefore, certain characteristics of the data structure layout. The parameters can be specified to achieve a data layout that provides a desired combination of program execution speed and required memory capacity.

2 Claims, 7 Drawing Sheets

FLEXIBLE DATA STRUCTURE LAYOUT FOR DATA STRUCTURE INCLUDING BIT-FIELD DATA MEMBERS

BACKGROUND OF THE INVENTION

1. Field of the Invention

This invention is related to layout of data structures and, in particular, to layout of data structures including bit-field data members.

2. Related Art

Computer programming languages generally support several types of data. For example, the C and C++ programming languages allow data to be of type "int" (integer number), "char" (character), "float" (real number) or "double" (double precision real number), among others. Related data is often collected together in a group. For example, in C and C++, the data (of any type) can be collected together into user-defined groups called "structs". Each item of data in a data structure is a "data member".

In C and C++, the data types listed above are called "basic types" (Other data types, such as arrays, also exist. Even a data structure can be a data type, i.e., a data structure can be a data member within another data structure.) Generally, associated with each basic type of data is a predefined number of bits of memory ("basic type size") for storing a data member of that type. Generally, the basic type size depends upon the architecture of the computer that is used for processing the data. For example, on most computers, the basic type size of the "int" basic type is 32 bits (4 bytes) and the basic type size of the "char" basic type is 8 bits (1 byte).

In addition to the above-listed basic types, C and C++ (as well as other programming languages) support another group of data types, called "bit-fields". Bit-fields are special cases of other basic types, bit-fields having a size that, unlike a typical basic type size, is not specified as a number of bytes, but rather as a number of bits that may or may not (typically, not) correspond to an exact number of bytes. Generally, bit-fields can have a size of any number of bits. Bit-fields can be of any integer scalar (i.e., subject to representation by a "count") basic type, such as "int", "short int", "long int", or "char". A data member may be specified as a bit-field, for example, when it is known that the data member will always require no more than a particular number of bits that is less than the number of bits of the basic type size of the corresponding basic type. A data member may also be specified as a bit-field, for example, to facilitate mapping of the data member to corresponding bits of an external entity such as a control register of an I/O device.

In addition to defining the amount of memory allocated for storage of a data member, e.g., the basic type size, computer architecture can restrict the location of the beginning of each data member, i.e., the computer architecture defines an "alignment requirement" for each data member. Generally, the computer architecture defines an alignment requirement for each data type. For example, a 32-bit RISC CPU may require that all 32-bit data (e.g., data of type "int") begin on a 32-bit address boundary, i.e., at the first bit of the zeroth byte, the fourth byte, the eighth byte, etc. Or, a CPU (e.g., the Motorola 68000 processor) may require that such data begin on a 16-bit address boundary, i.e., at the first bit of the zeroth byte, the second byte, the fourth byte, etc. Further, some programming languages may place restrictions on the placement of data within a memory. For example, the C and C++ programming languages require that the address of each data member of a structure be higher than that of data members of the structure for which memory has previously been allocated.

"Data structure layout" is the process of allocating a portion of a memory for each data member of a data structure. Typically, this is done by defining the location in memory at which each data member begins. An initial address is established as the location of the beginning of a first data member of the data structure. The remaining data members are sequentially processed to determine a location of the beginning of each data member, expressed as an offset (data member offset) from the initial address.

In previous data structure layout methods, the data member offsets are determined, in the first instance, to adequately accommodate the size of each data member and to conform to the alignment requirement of the data type of each data member. To ensure that each data member is placed in memory at a location which satisfies the alignment requirement of the data member, unused bits ("padding bits") may be introduced between adjacent data members in memory. The largest alignment requirement of a data member of the data structure is defined as the alignment requirement of the data structure. After all data members are layed out, additional bits ("trailing bits") are added to the end of the data structure so that the size of the data structure is a multiple of the structure alignment requirement. This is done to ensure that, if the data structure is included in an array of other similar data structures, each of the data structures in the array will be properly aligned, i.e., conform to the structure alignment requirement.

Data structure layout for data structures including bit-field data members is more complicated than data structure layout for data structures that do not include bit-field data members. Most computer architectures allocate memory in bytes rather than in bits. Thus, a data structure layout method must account for the "non-standard" sizes (i.e., sizes not expressed in bytes) of the bit-field data members. Additionally, bit-field data members may be allocated to the unused portion of the allocation for a preceding data member. And, bit-field data members can begin at other than the beginning of a byte and end at other than the end of a byte.

Computer systems, particularly real-time or embedded systems, often impose particular constraints on the layout of the data structures of a computer program. For example, as indicated above, bit-field data members of a data structure may need to map to an I/O port layout or to a status register of the system. Further, it is desirable that the data structures of a computer program be capable of being layed out in a manner that is compatible with different computer systems so that data can be easily shared between the systems. For example, it is desirable that a data structure layout be compatible with different microprocessors having different data alignment requirements. Existing data structure layout methods have not adequately provided these capabilities.

SUMMARY OF THE INVENTION

Generally, a method according to the embodiment of the invention for laying out data members of a data structure, the data members including bit-field data members, includes the steps of: i) accepting as input an identifier of each data member, a data type for each data member, and a data type size for each data member; ii) accepting as input the value of one or more of parameters specified by a user; iii) sequentially determining a member offset for each of the data members, wherein the determination of the member offset of each data member is dependent upon whether the data member is a bit-field data member or not and the determination of one or more of the member offsets is dependent upon the one or more values of the parameters;

and iv) determining a size of the data structure. The parameters can include one or more of the following: i) a parameter that indicates a minimum alignment requirement of the structure; ii) a parameter or parameters that indicates the degree to which the structure is to be packed; iii) a parameter that indicates whether or not the allocation unit of a bit-field data member can overlap with the allocation unit of a data member for which memory has already been allocated; iv) a parameter that indicates, if the structure is an unpacked structure, an increment that defines where a new allocation unit for a bit-field data member will start relative to the allocation unit for the previous data member; and v) a parameter that indicates whether to allocate an unused portion of the allocation unit of the last data member for which a member offset was determined.

The invention produces data structure layout in a flexible manner that enables the data structures of a computer program to be layed out in a manner that conforms to constraints imposed by a particular computer system on which the program is implemented and that enables the produced data structure layout to be used with different computer systems having different constraints. The parameters enable a user to control aspects of the manner in which data structure layout is achieved and, therefore, certain characteristics of the data structure layout. The parameters can be specified to achieve a data layout that provides a desired combination of program execution speed and required memory capacity. The invention is particularly useful with systems that require close control of data structure layout, especially when the data structures must map directly to particular hardware. Embedded real-time systems, which are often implemented on hardware which is designed and optimized for a particular application, are one example of the type of system with which the invention can advantageously be used.

In another embodiment of the invention, a method for laying out the data members of a plurality of hierarchically related data structures, the data members including bit-field data members, includes the steps of: i) accepting as input an identifier of each data member, a data type for each data member, a data type size for each data member, and an identifier of the data structure to which the data member corresponds; ii) accepting as input the value of a parameter specified by a user, the parameter indicating whether each data structure is to be packed or not; iii) sequentially determining a member offset for each of the data members of all of the plurality of data structures, wherein the determination of the member offset of each data member is dependent upon whether the data member is a bit-field data member or not and the determination of one or more of the member offsets is dependent upon the value of the parameter; and iv) determining a size of the data structure.

DETAILED DESCRIPTION OF EMBODIMENTS OF THE INVENTION

Figure 1:
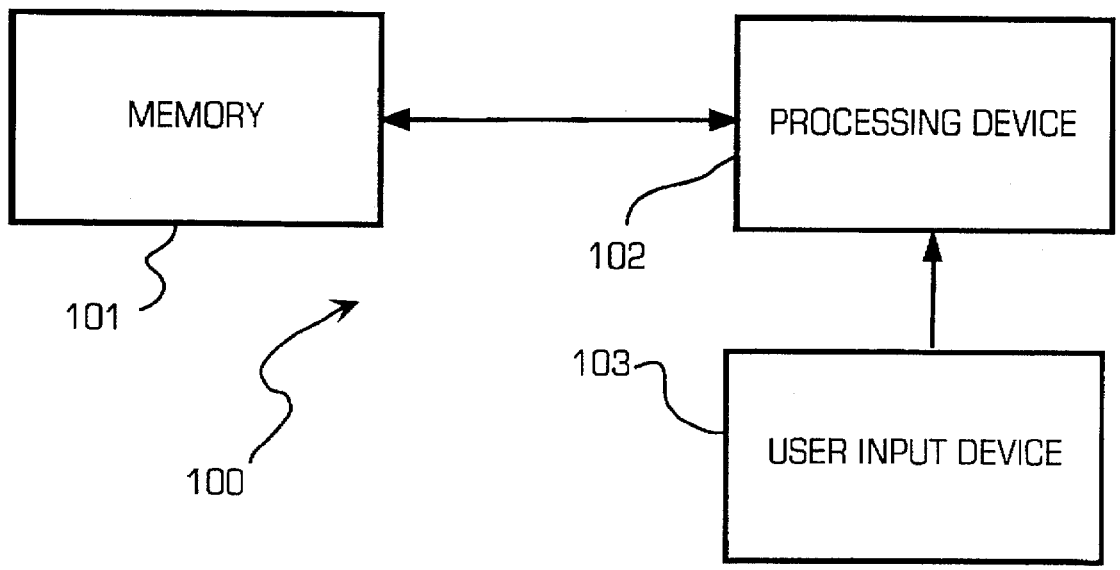
FIG. 1 is a block diagram of a system with which the invention can be implemented.

The invention is used to lay out the data members of a data structure, i.e., designate regions of a memory that are reserved for storage of the data of each data member. The invention accepts as input a list of the data members (which include bit-field data members) of the data structure along with a description of the data type of each data member and the size associated with the data type of the data member. This information can be used by the data layout method of the invention, along with userspecified information regarding pre-defined parameters (discussed further below), to produce a member offset for each data member (i.e., identification of the starting bit of the contiguous region allocated for storage of the data of the data member), a size of the data structure (i.e. the amount of memory, typically expressed in bytes, allocated for storage of the data of the data structure), and a structure alignment (i.e., a restriction on the starting location in memory of the data structure).

The method for determining data structure layout begins with the initialization of certain variables that are used in the method. Following this initialization, the data members are processed one by one in the order in which the data members appear in the data member list. For each data member, the method first establishes the data type of the data member and the associated size of that data type. Then the method determines whether the data member is a bit-field data member or not. Determination of the member offset of a data member occurs in one way (discussed in more detail below) for bit-field data members and in another way (also discussed in more detail below) for non-bit-field data members. After the member offset of the data member is determined, the value of the member offset is stored, then the member offset is incremented by the size of the data member to define a bit on or after which the memory allocation for the next data member must begin. After a member offset is determined for all data members, additional bits may be added to the end of the data structure layout to satisfy a user-selected specification regarding the location of the end of the data structure.

According to the invention, data members of a data structure are layed out in a manner that can be tailored to conform to constraints imposed by a particular computer system. The flexible manner in which the invention produces a data structure layout enables production of a data structure layout that can be used with different computer systems having different constraints. Additionally, certain characteristics of the data structure layout can be controlled by a user through appropriate specification of predefined parameters, enabling the user to achieve a data structure layout that provides a desired combination of program execution speed and required memory capacity.

As mentioned above, the invention enables one or more of a multiplicity of predefined parameters to be controlled by a user. One parameter allows the user to specify whether the data structure is to be "packed" (defined below) or not (see step 302 in FIG. 3 and step 503 in FIG. 5A, below). The user can also specify a parameter which effectively allows a variable amount of packing of the structure (see the description accompanying step 304 of FIG. 3). Another parameter allows the user to specify whether unused space allocated to a bit-field container is to remain allocated in the final data structure layout (see step 210 in FIG. 2, step 306 in FIG. 3, step 512 in FIG. 5A and FIG. 4, below). Still another parameter allows the user to specify whether a bit-field container can overlap with the "allocation unit" (addressable unit of space allocation) of a preceding non-bit-field data member or the bit-field container of a preceding bit-field data member (see step 305 in FIG. 3 and step 506 in FIG. 5A, below). Yet another parameter allows the user to specify, for an unpacked data structure, where a new bit-field container will start relative to the previous bit-field container (see steps 505b, 505c, 505d in FIG. 5A, below). Another parameter allows the user to specify the minimum alignment requirement of the structure (see the description accompanying step 202 of FIG. 2, below). Finally, for a hierarchically related set of data structures, the user can specify whether each of the data structures is packed or not (see FIG. 8 and accompanying description, below). Specification of each of these parameters can be through a language extension or a command line option to the compiler. The operation and effect of these parameters are explained in more detail below.

FIG. 1 is a block diagram of a system 100 with which the invention can be implemented. The system 100 includes a memory 101, a processing device 102 and a user interface device 103. The memory 101 typically includes a RAM and a ROM. The processing device 102 can be, for example, a microprocessor. The user interface device 103 can include, for example, a keyboard, a mouse, and a display.

The source code of a computer program is stored in the memory 101. To implement the program, the program must be compiled using the processing device 102. As part of the compilation, the layout in memory of data structures of the program is prescribed. As described generally above and in more detail below with respect to particular embodiments of the invention, the processing device 102 implements a flexible data structure layout method according to the invention that enables a data structure layout to be achieved that satisfies various hardware constraints. Additionally, as explained in more detail below, the user interface device 103 allows the user to control certain parameters that produce desired characteristics of the data structure layout.

Below, a particular embodiment of a data structure layout method according to the invention is described. However, first, various preliminary definitions and concepts will be described in order to facilitate the discussion of the data structure layout method of the invention. Additionally, for many of the defined terms (defined terms are enclosed in quotation marks) the name of the corresponding variable used in the particular embodiment of the invention described below with respect to FIGS. 2, 3, 4, 5A and 5B is given in parentheses after the defined term.

"Member type" (MEMBER_TYPE) refers to the data type of a data member. Non-bit-field data members have a member type that is one of the basic data types, e.g. "int", "char","float", "real", "array" or "struct". Bit-field data members have a member type that is expressed as one of the integer scalar basic data types modified by being characterized as a bit-field. Thus, for example, the data type of a data member may expressed as an integer bit-field and the basic type is said to be integer ("int").

"Member size" (MEMBER_SIZE) refers to the amount of memory that is allocated for a data member. For non-bit-field data members this is typically specified as a number of bytes. For example, the member size of a data member of data type "int" is often specified to be 4 bytes and the member size of a data member of data type "char" is often specified to be 1 byte. The size of the "allocation unit" for non-bit-field members equals the member size. For bit-field data members, the member size is typically specified as a number of bits.

"Member offset" (MEMBER_OFFSET) refers to the location of the first bit of a data member with respect to the first bit of the data structure. "Member end" (MEMBER_END) refers to the location of the last bit of memory space allocated to a data member and is equal to one less than the member offset plus the member size (MEMBER_OFFSET+MEMBER_SIZE-1).

"Bit field container" (BFC) refers to the allocation unit for a bit-field data member. "Bit-field container size" (BFC_SIZE) refers to the size of the bit-field container, i.e., the amount of memory allocated for a bit-field data member, and is typically specified as the member size of the non-bit-field data type from which the bit-field data member is derived. The "starting bit of the bit-field container" (BFC_START) refers to the location of the first bit of the bit-field container. The "ending bit of the bit-field container" (BFC_END) refers to the location of the last bit of the bit-field container and is equal to one less than the starting bit of the bit-field container plus the bit-field container size (BFC_START+BFC_SIZE-1).

"Previous bit field container" (PBFC) refers to a bit-field container of a bit-field data member for which memory has previously been allocated and which was not completely filled by that bit-field data member. "Previous bit-field container size" (PBFC_SIZE) refers to the size of the previous bit-field container. The "starting bit of the previous bit-field container" (PBFC_START) refers to the location of the first bit of the previous bit-field container. The "ending bit of the previous bit-field container" (PBFC_END) refers to the location of the last bit of the previous bit-field container and is equal to one less than the starting bit of the previous bit-field container plus the previous bit-field container size (PBFC_START+PBFC_SIZE-1).

"Alignment requirement" refers to a restriction on the starting location in memory of the item subject to the alignment requirement. For example, some computer architectures impose an alignment requirement on data members of data type "int" that requires those data members to begin with a byte that has an address which is a multiple of four. "Member alignment" (MEMBER_ALIGN) refers to the alignment requirement of a particular data member and, as suggested above, is typically determined according to the data type of the data member. "Bit-field container alignment" (BFC_ALIGN) refers to the alignment requirement of a particular bit-field container and is typically determined according to the data type of the bit-field data member with which the bit-field container is associated. "Structure alignment" (STRUCT_ALIGN) refers to the alignment requirement of a data structure and is typically determined as the largest member alignment of a data member of the structure. This is done to ensure that all member alignments are satisfied during layout of the data structure, since, otherwise, it would not be possible to identify, with respect to the beginning of the data structure, bit locations that satisfy each member alignment.

"Minimum structure alignment" (MIN_ALIGN) refers to the minimum alignment requirement of a data structure. The minimum alignment requirement is a user-specified parameter, typically specified in bytes, for which separate values can be specified for unpacked and packed data structures. A default value (typically governed by the processor being used) is specified that is used if the user does not specify a value. The minimum alignment requirement is generally used to ensure that the alignment of each data member of a data structure corresponds to the word size of the processor which is using the data structure. Such a correspondence facilitates movement of data by the processor, since it is generally more efficient to move data by the word rather than by the byte.

"Bit-field container increment" (BFC_INCR) refers to the amount by which the starting bit of a bit-field container is increased when it is necessary to move the location of a bit-field container to ensure that the last bit of a bit-field data member is within the bit-field container. In the embodiments of the invention described below, the bit-field container increment is equal to the bit-field container size or the number of bits required to move the starting bit of the bit-field container to the next bit that meets the bit-field container alignment requirement.

"Next available free bit" (NAFB) is the next available free bit after the last data member for which memory has been allocated. During the process of determining a memory allocation for a data member, the next available free bit is used to keep track of the starting bit (member offset) of the memory allocation. In a data structure layout method according to the invention, the next available free bit generally changes position a number of times during the determination of the member offset of a data member.

"Structure size" (STRUCT_SIZE) refers to the amount of memory allocated for storage of the data of a data structure. As will be apparent from the description below, the structure size is equal to the position of the next available free bit at the end of a data structure layout method according to the invention.

Figure 2:
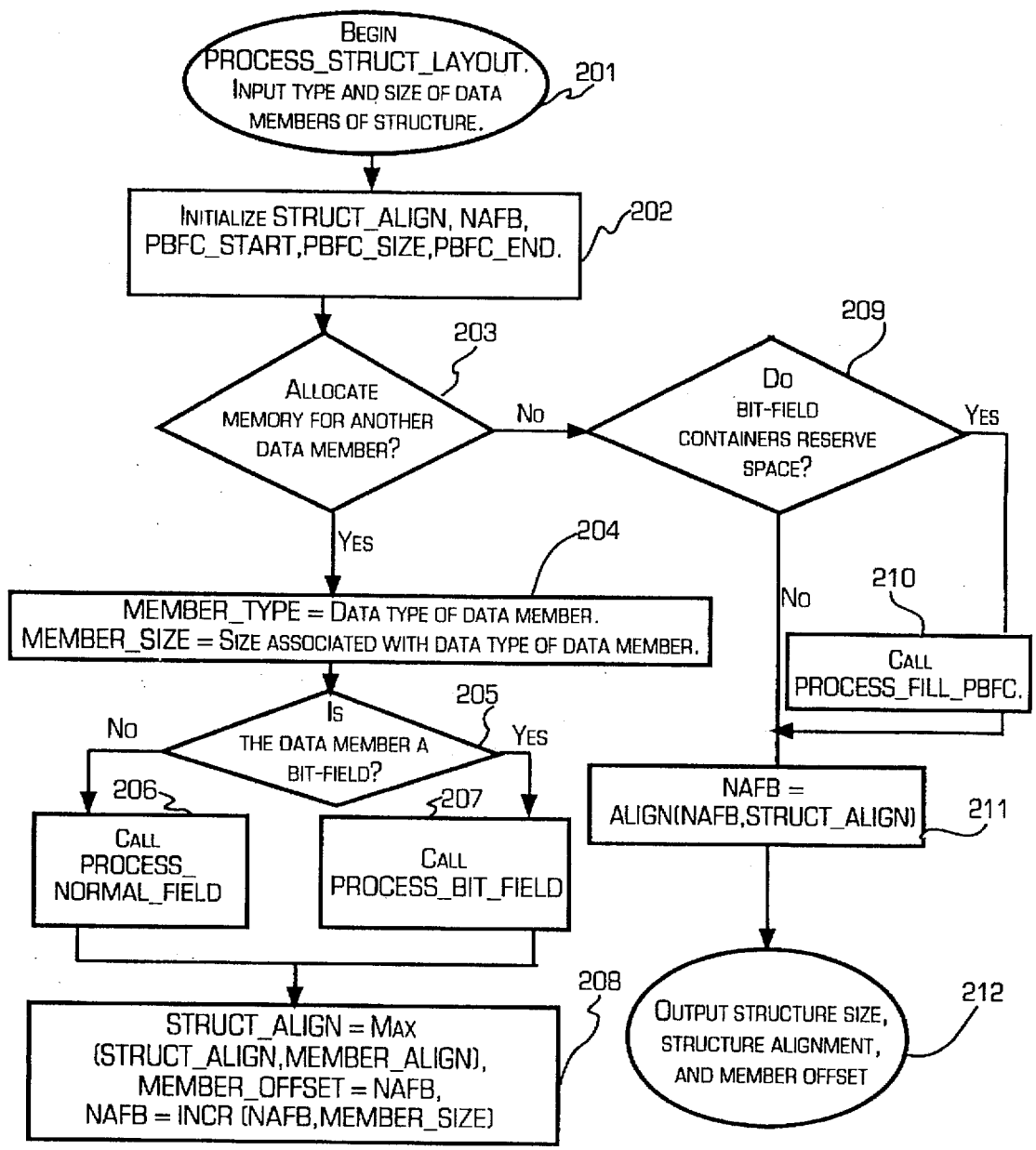
FIGS. 2, 3, 4, 5A and 5B are, together, a flow chart of a method according to a particular embodiment of the invention.
Figure 3:
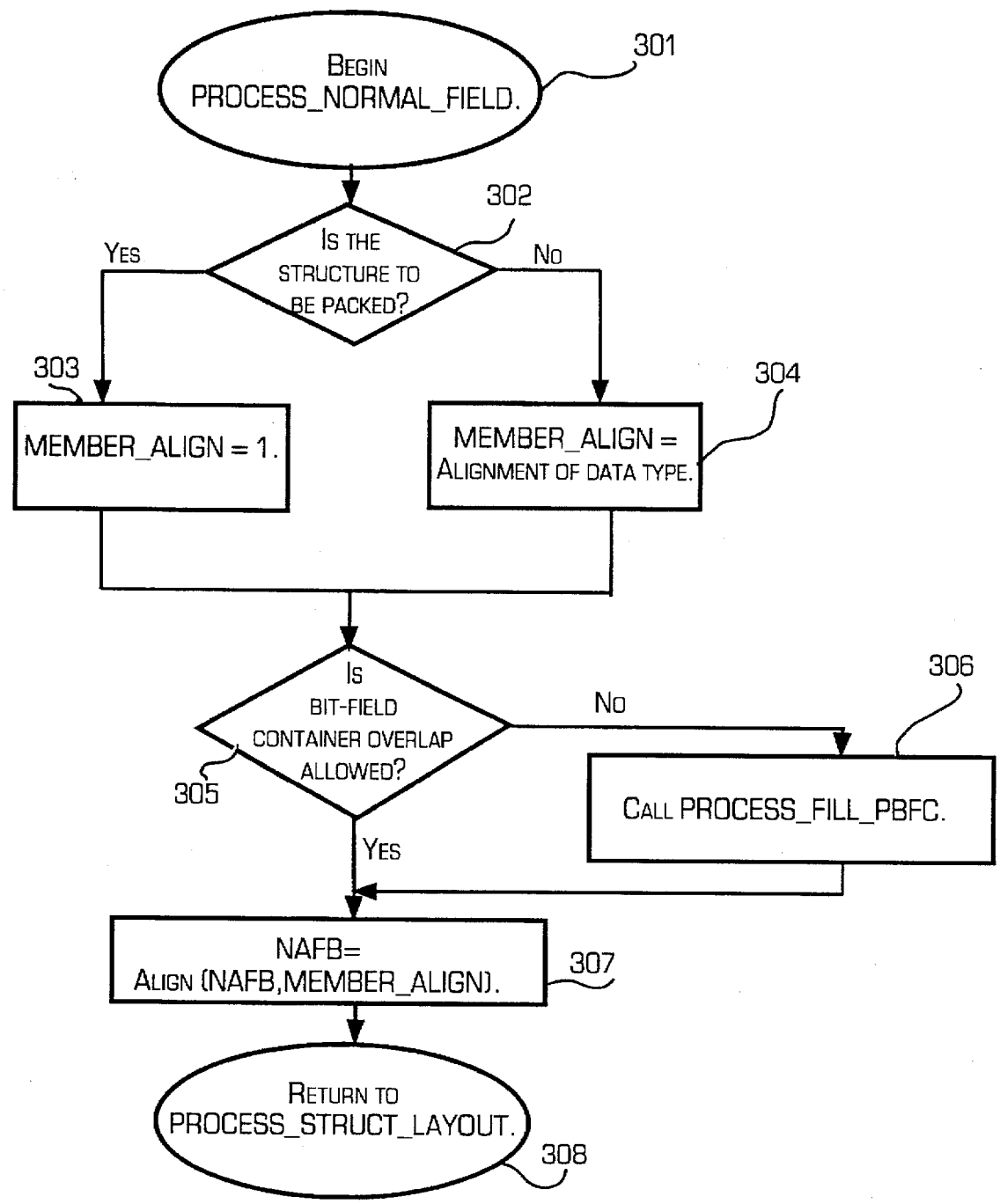
Figure 4:
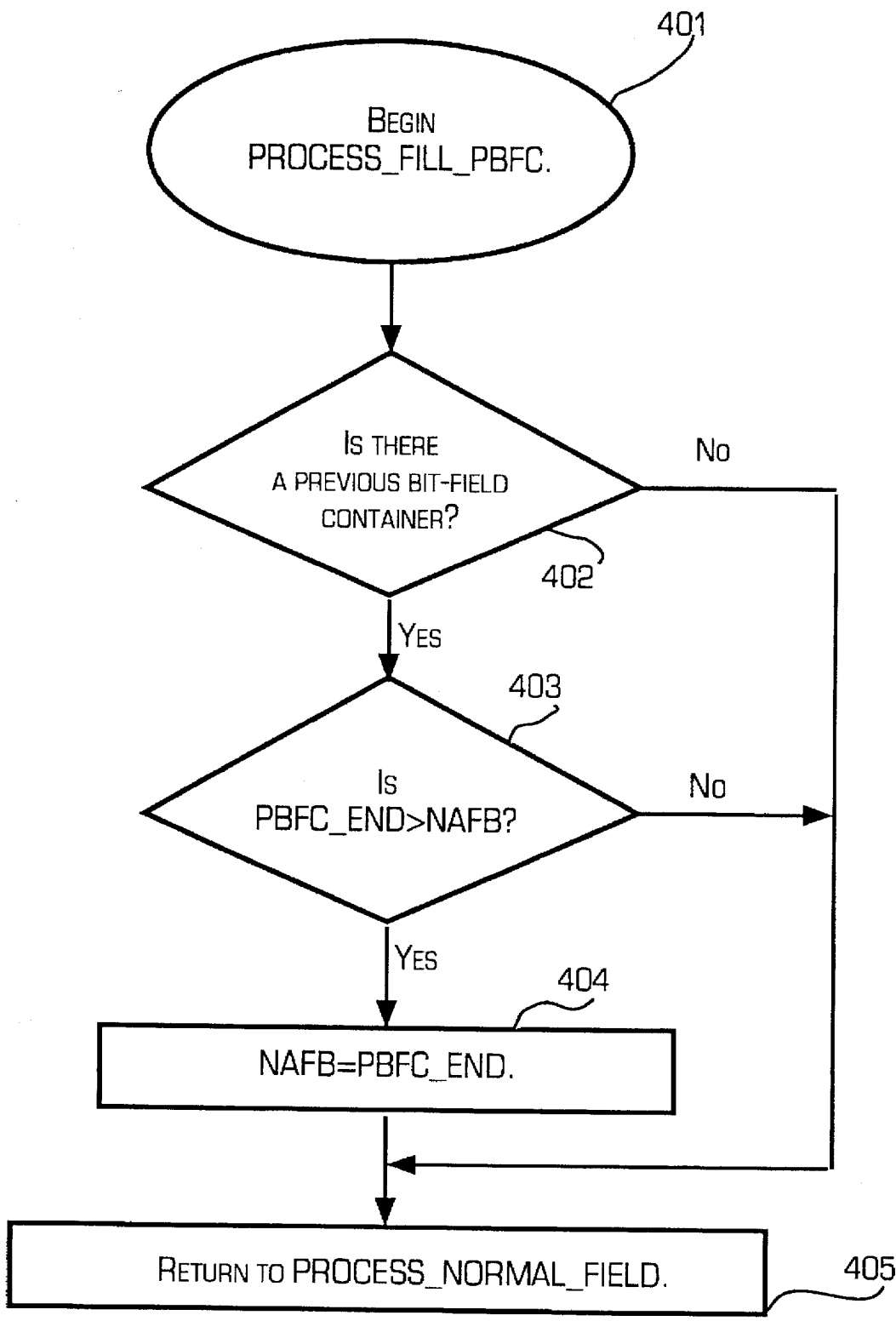
Figure 5A:
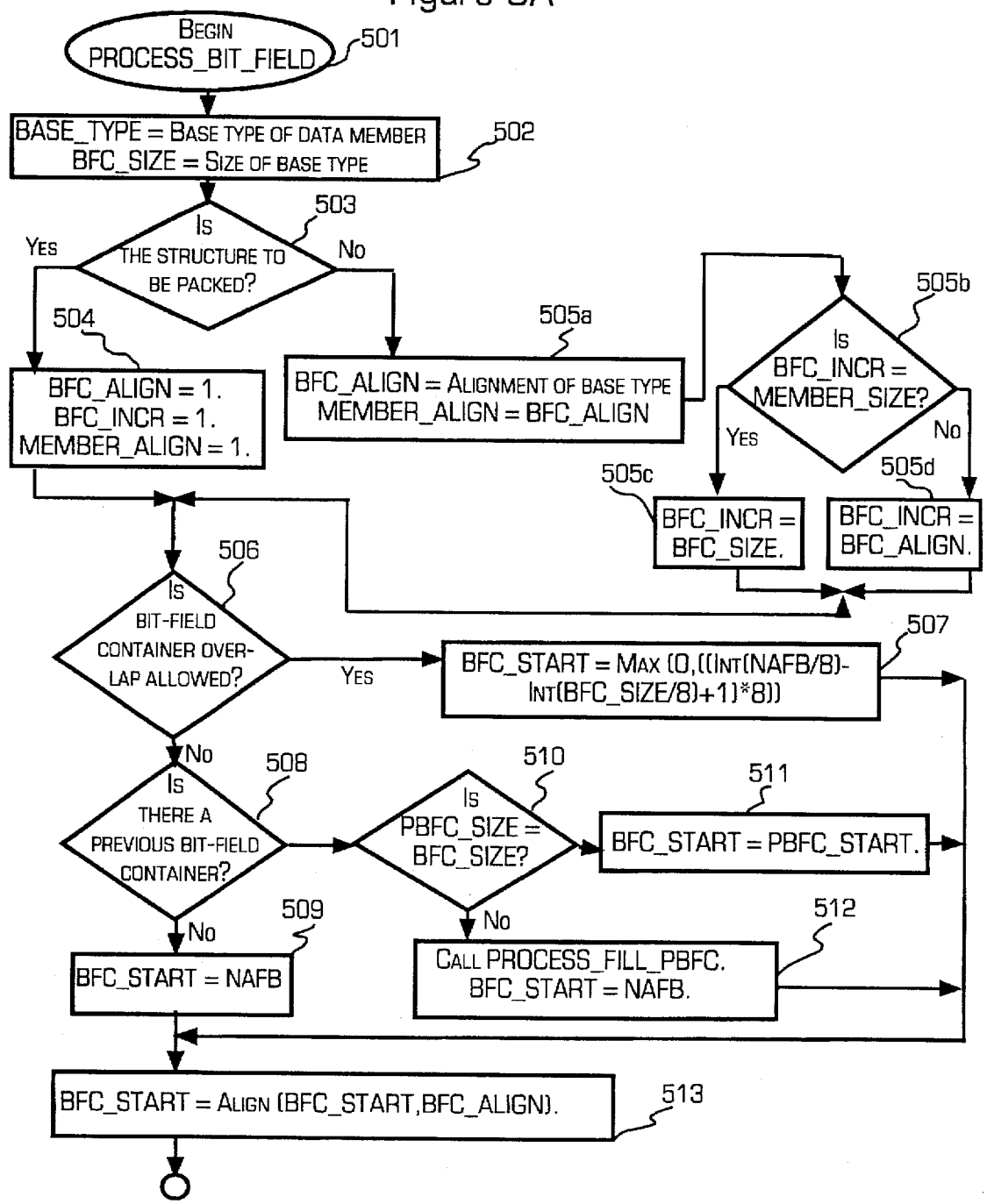
Figure 5B:
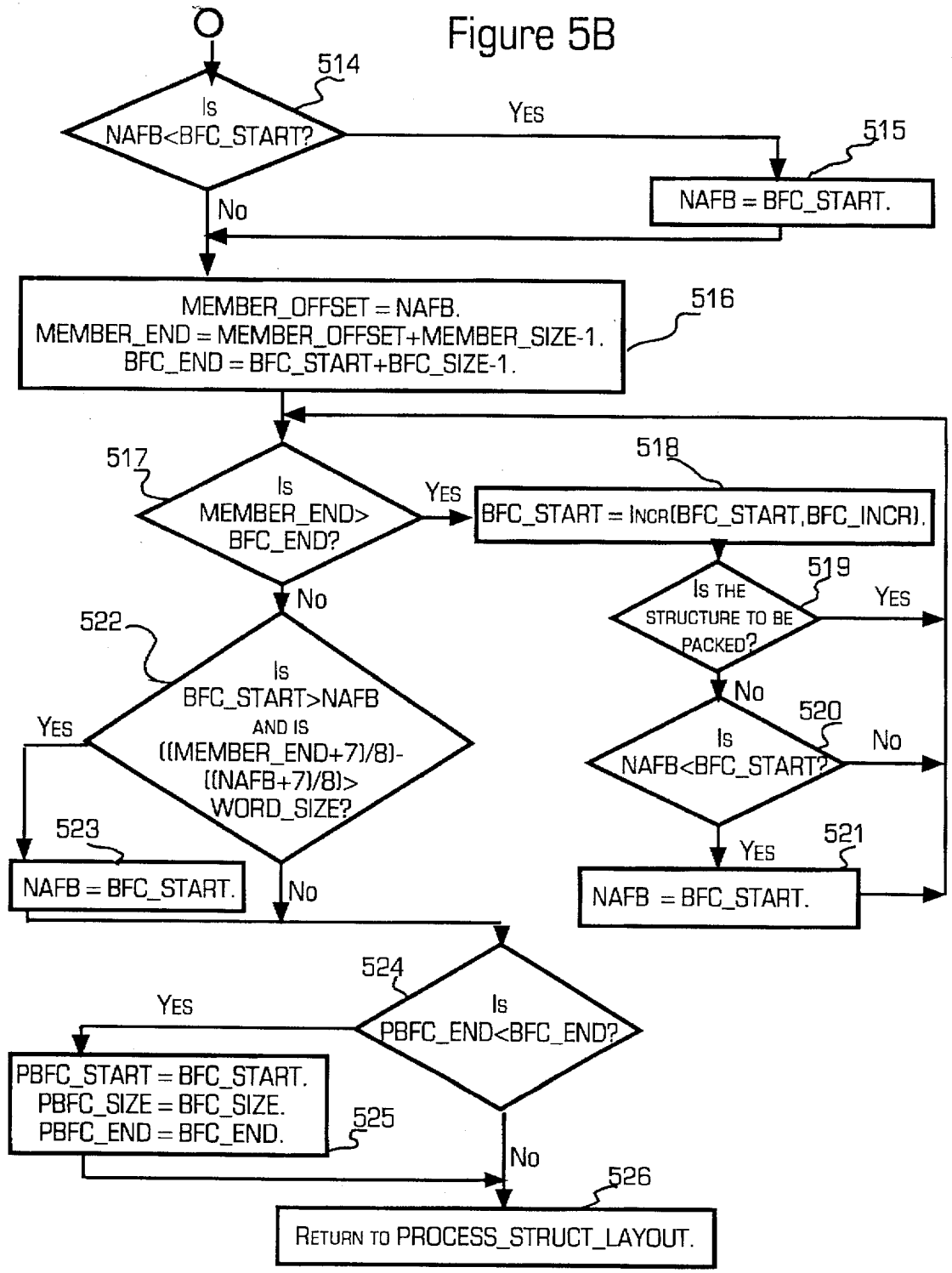

FIGS. 2, 3, 4, 5A and 5B are, together, a flow chart of a method according to an embodiment of the invention for defining a data structure layout for data members including bit-field data members as well as other types of data members. FIG. 2 is a flow chart of the main process, PROCESS_STRUCT_LAYOUT, for determining the data structure layout. FIG. 3 is a flow chart of a sub-process, PROCESS_NORMAL_FIELD, for determining the layout of non-bit-field data members. FIG. 4 is a flow chart of a sub-process, PROCESS_FILL_PBFC, for allocating the unused bits of a bit-field container. FIGS. 5A and 5B are, together, a flow chart of a sub-process, PROCESS_BIT_FIELD, for determining the layout of bit-field data members.

The main process (PROCESS_STRUCT_LAYOUT) for determining the data structure layout begins with step 201 of FIG. 2. In step 201, a list of the data members of the data structure, the data type of each data member, and the size of each data member are input to PROCESS_STRUCT_LAYOUT.

In step 202, various variables are initialized. The structure alignment (STRUCT_ALIGN) is initialized to the minimum structure alignment (MIN_ALIGN). (The value of MIN_ALIGN is a user-specified value.) The next available free bit (NAFB) is initialized to zero to facilitate the layout method, i.e., to allow bit locations to be specified easily by relating the bit location directly to the beginning bit of the data structure. The starting bit of the previous bit-field container (PBFC_START) and the size of the previous bit-field container (PBFC_SIZE) are both initialized to zero, since, at the beginning of data structure layout, the layout possibilities (discussed below) associated with a previous bit-field container are not possible.

After initialization of variables, the data members are processed one by one in the order in which the data members appear in the data member list. This is implemented by step 203, in which a determination is made as to whether the data structure includes an additional data member for which memory must be allocated. Only at the end of the data structure layout, after memory has been allocated for all data members, will there not be an additional data member for which memory must be allocated. Thus, generally, from step 203, and after memory allocation for each data member, PROCESS_STRUCT_LAYOUT proceeds to step 204 to begin the process of memory allocation for another data member.

In step 204, the data type (MEMBER_TYPE) of the data member being processed and the associated size (MEMBER_SIZE) of that data type are established. For either bit-field data members or non-bit-field data members, the data type is specified as one of the data types allowed by the programming language with which the data structure is being used. For example, in C or C++, the data type could be "int", "short int", "long int" or "char". The data type size is specified as a number of bytes for non-bit-field data types and a number of bits for bit-field data types. For example, the data type size of the data type "int" is often specified as four bytes, the data type size of the data type "short int" is often specified as two bytes, and the data type size of the data type "char" is always specified as one byte. In contrast, the data type size of a bit-field data member of data type "int" can be specified as any number of bits, depending on the exact nature of the data stored in the bit-field data member.

In step 205, a determination is made as to whether the data member is a bit-field data member or a non-bit-field data member. If the data member is not a bit-field data member, then PROCESS_NORMAL_FIELD is called, as shown by step 206 and discussed in detail below with respect to FIG. 3. If the data member is a bit-field data member, then PROCESS_BIT_FIELD is called, as shown by step 207 and discussed in detail below with respect to FIGS. 5A and 5B. PROCESS_NORMAL_FIELD and PROCESS_BIT_FIELD determine memory allocation for a non-bit-field data member and a bit-field data member, respectively, i.e., PROCESS_NORMAL_FIELD and PROCESS_BIT_FIELD both define a location of the next available free bit (NAFB) that conforms to various criteria implicit in the layout method.

After memory allocation for a data member (either a bit-field data member or a non-bit-field data member) is complete, in step 208, the value of several variables is updated. If the member alignment (MEMBER_ALIGN) of the data member for which memory was just allocated is greater than the existing structure alignment (STRUCT_ALIGN), then the structure alignment is increased to be equal to that member alignment. This is done, as explained above, to ensure that all member alignments are satisfied during layout of the data structure. The member offset (MEMBER_OFFSET) is made equal to the next available free bit. Since the next available free bit will change location during memory allocation for the next data member, this is necessary to store the beginning bit of the memory allocation for the recently allocated data member. The member offsets can be stored in a data structure devoted to storing information regarding the data structure layout being determined by the invention. After the member offset is recorded, the next available free bit is incremented by the member size (MEMBER_SIZE) of the data member. As explained elsewhere, the member size is given as a number of bytes for non-bit-field data members and a number of bits for bit-field data members. The new position of the next available free bit provides a starting point from which to begin the determination of the memory allocation for the next data member.

As indicated above, the manner in which memory is allocated for each data member is dependent on whether the data member is a non-bit-field data member or a bit-field data member. If, in step 205, it is determined that the data member is a non-bit-field data member, then, in step 206, PROCESS_NORMAL_FIELD is called to allocate memory to the non-bit-field data member. Non-bit-field data members for which PROCESS_NORMAL_FIELD is used to allocate memory include all basic types as well as arrays and structs. The steps in PROCESS_NORMAL_FIELD are shown in FIG. 3.

The beginning of PROCESS_NORMAL_FIELD is shown by step 301. Initially, as shown by step 302, a determination is made as to whether the data structure is packed or unpacked. Specifying a data structure as packed means that the member alignment of each data member of the data structure is 1 byte. Specifying a data structure as unpacked, in contrast, does not place any limitation on the data structure. In a packed data structure, memory is allocated more densely than in an unpacked data structure.

Figure 6A:
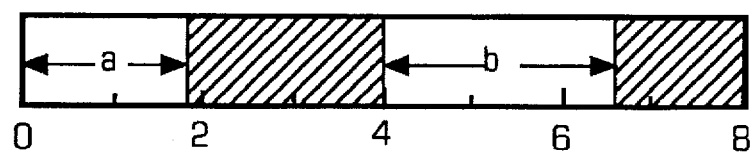
FIG. 6A and 6B illustrate the effect on the data structure layout for a simple C structure of specifying whether the data structure is to be packed or unpacked.
Figure 6B:
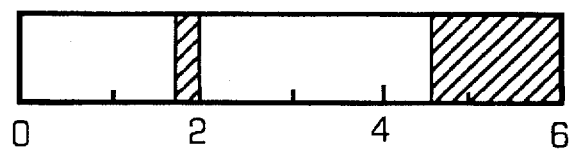

FIGS. 6A and 6B illustrate the effect of this choice on data structure layout for the following simple C structure:

```
struct {
    int a: 15;
    int b: 20;
};
```

The member size of "int" is assumed to be 4 bytes. FIG. 6A shows the unpacked structure: the data member "b" begins at byte 4, the next available byte that starts a new allocation unit. FIG. 6B shows the packed structure: "b" begins at byte 2, the next available byte that satisfies the alignment requirement (1 for a packed structure).

According to the invention, whether a data structure is packed or not is a parameter that can be specified by the user. If the user makes no packing specification, then a default packing specification (which can be either packed or unpacked) is used. While as a matter of good practice a user may explicitly specify for each data structure whether the data structure is to be packed or unpacked, generally, it is only necessary to specify that a data structure is packed when the default packing specification is unpacked and that a data structure is unpacked when the default packing specification is packed.

If the data structure is packed, the member alignment (MEMBER_ALIGN) is set equal to 1 byte, as shown by step 303. Setting the member alignment equal to 1 byte means that no padding bytes will be placed between data members, thereby causing the data structure to be more densely packed than would be the case if the data structure was unpacked.

If the data structure is unpacked, the member alignment is set equal to the alignment requirement of the data type of the data member, as shown by step 304. For example, in one embodiment, for an unpacked data structure the member alignment of a data member of data type "int" is 4 bytes and the member alignment of a data member of data type "char" is 1 byte. For data members having a relatively small member size and a member alignment greater than 1 byte, it will be necessary to add padding bytes after the memory allocation for the data member, thereby causing the data structure to be less densely packed than would be the case if the data structure was packed.

According to the invention, an additional user-specified parameter can be used to modify the member alignment of certain data members, allowing the user to produce a data structure layout that is compatible with different processors. This parameter can also be used to control the degree to which a structure is packed. This may be useful to force a data structure to be layed out in a manner that makes the data structure compatible for use with different types of processors. In one embodiment of the invention, this parameter includes a first option that causes all data members having a member size greater than or equal to 2 bytes to have a member alignment of 2 bytes, and a second option that causes all data members having a member size greater than or equal to 4 bytes to have a member alignment of 4 bytes.

For example, a first type of processor may have an alignment requirement of 2 bytes for a data type having a size of 4 bytes, while a second microprocessor has an alignment requirement of 4 bytes for the same data type. Thus, these two processors will cause data to be layed out in two different ways. Specification of either the first or second option above causes the same data structure layout to be produced for either processor. Specification of the first option results in a layout that would normally be produced by the first processor (alignment requirement of 2 bytes) and the specification of the second option results in a layout that would normally be produced by the second processor (alignment requirement of 4 bytes). In either case, the user-specified parameter enables a flexible data structure layout to be produced that can be used with either processor.

Figure 7A:
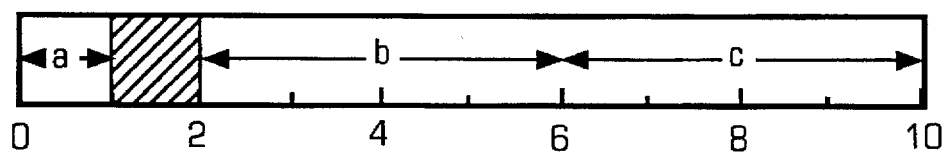
FIGS. 7A and 7B illustrate the effect on the data structure layout for a simple C structure of specifying particular values of a parameter that enables a data structure to be layed out in a manner that makes the data structure compatible for use with a particular type of processor.
Figure 7B:
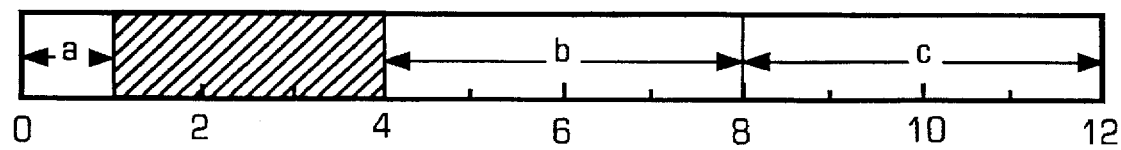

FIGS. 7A and 7B illustrate the effect of this choice on data structure layout for the following simple C structure:

```
struct {
    char a;
    int b;
    float c;
};
```

The member sizes of "char", "int" and "float" are assumed to be 1, 4 and 4 bytes, respectively. FIG. 7A shows the data structure that results on a machine having an integer alignment requirement of 2 bytes. FIG. 7B shows the data structure that results on a machine having an integer alignment requirement of 4 bytes. Specification of the option that causes all data members having a member size greater than or equal to 4 bytes to have a member alignment of 4 bytes causes the data structure of FIG. 7A to look like that of FIG. 7B. Specification of the option that causes all data members having a member size greater than or equal to 2 bytes to have a member alignment of 2 bytes causes the data structure of FIG. 7B to look like that of FIG. 7A. As seen, in effect, this parameter also controls the degree to which a data structure is packed.

After the value of the member alignment is established, a determination is made as to whether bit-field container overlap is allowed, as shown by step 305. Overlap allows the unused portion of a memory allocation for an already allocated bit-field data member to be used in the memory allocation of a subsequently allocated data member. Thus, if overlap is allowed, memory is allocated more densely than is the case if overlap is not allowed. According to the invention, whether overlap is allowed or not is a parameter that can be specified by the user. If the user makes no overlap specification, then a default overlap specification (which can be either overlap allowed or overlap prohibited) is used.

If overlap is not allowed, then the process PROCESS_FILL_PBFC is called, as shown by step 306. PROCESS_FILL_PBFC has the effect of "filling" the unused bits of a previous bit-field container, i.e., any unused portion of a previous memory allocation is allocated, making that unused portion unavailable for use by a subsequently allocated data member. The steps in PROCESS_FILL_PBFC are shown in FIG. 4.

The beginning of PROCESS_FILL_PBFC is shown by step 401. In step 402, a determination is made as to whether a previous bit-field container exists. If a previous bit-field container does not exist, then, as shown by step 405, the layout method returns to the process PROCESS_NORMAL_FIELD (FIG. 3).

If a previous bit-field container does exist (i.e., the previously allocated data member was a bit-field data member), then, in step 403, a determination is made as to whether the ending bit of the previous bit-field container (PBFC_END) is greater than the next available free bit (NAFB). If not, then, in step 405, the layout method returns to the process PROCESS_NORMAL_FIELD (FIG. 3). This occurs because if the next available free bit is greater than the ending bit of the previous bit-field container, there are no unused bits in the previous bit-field container.

If the ending bit of the previous bit-field container is greater than the next available free bit, then the next available free bit is set equal to the ending bit of the previous bit-field container, as shown by step 404. This has the effect of causing the unused bits of the previous bit-field container to be allocated, i.e., the previous bit-field container is "filled". After filling the previous bit-field container, in step 405, the layout method returns to the process PROCESS_NORMAL_FIELD (FIG. 3).

Returning to FIG. 3, if overlap is allowed (step 305), then the next available free bit (NAFB) is aligned to the next highest bit that satisfies the member alignment requirement (MEMBER_ALIGN), as shown by step 307. This has the effect of allowing unused bits of a previous bit-field container to be used if it is possible to locate the subsequent data member among the unused bits so as to satisfy the alignment requirement of the data member.

At this point, the memory allocation for the non-bit-field data member is established, i.e., the location of the starting bit of the non-bit-field data member is defined by the next available free bit. As shown by step 308, the layout method returns to the main process, PROCESS_STRUCT_LAYOUT (FIG. 2).

If, in step 205 of FIG. 2, it is determined that the data member is a bit-field data member, then, in step 207, PROCESS_BIT_FIELD is called to allocate memory to the bit-field data member. The steps in PROCESS_BIT_FIELD are shown in FIGS. 5A and 5B.

The beginning of PROCESS_BIT_FIELD is shown by step 501. In step 502, the basic type (BASE_TYPE) of the bit-field data member is determined from the member type. The size (BFC_SIZE) of the bit-field container for the bit-field data member is set equal to the size of the basic type. Bit-field data members can be of any scalar (i.e., subject to representation by a "count") basic type, such as "int", "short int", "long int", or "char".

In step 503, a determination is made as to whether the data structure is packed or unpacked. As discussed above, whether a data structure is packed or unpacked is a user-specified parameter that controls how densely memory is allocated for the data structure.

If the data structure is packed, both the bit-field container alignment (BFC_ALIGN) and the member alignment (MEMBER_ALIGN) are set equal to 1 byte, as shown by step 504. Additionally, the bit-field container increment (BFC_INCR) is also set equal to 1 byte.

If the data structure is unpacked, the bit-field container alignment is set equal to the alignment requirement of the data type of the bit-field data member and the member alignment is set equal to the bit-field container alignment, as shown by step 505a. The member alignment can also be modified by the user-specified parameter discussed above with respect to step 304. The value of the bit-field container increment for unpacked data structures is established via a user-specified parameter (see steps 505b, 505c and 505d). The user can specify either that the bit-field container increment be equal to the bit-field container size (BFC_SIZE) (see step 505c) or that the bit-field container increment be equal to the bit-field alignment requirement (see step 505d). Assuming that the alignment requirement for an "int" data member is 2 and that the member size is 4, for the following simple C structure, struct {
        int i1: 24;
        int i2: 24;
    };

selecting the bit-field container increment (BFC_INCR) to be equal to the bit-field container size (BFC_SIZE) results in a structure size of 8 bytes and selecting the bit-field container increment (BFC_INCR) to be equal to the bit-field container alignment (BFC_ALIGN) results in a structure size of 6 bytes.

After the value of the bit-field container alignment, the member alignment and the bit-field container increment are established, a determination is made as to whether bit-field container overlap is allowed, as shown by step 506. As discussed above with respect to step 305 of FIG. 3, overlap enables memory to be allocated more densely than is the case if overlap is not allowed. As stated above, the choice to allow overlap or not is a user-specified parameter. In this embodiment of the layout method of the invention, whether overlap is allowed or not can affect the location of the bit-field container, i.e., the region of memory within which the memory allocation for the bit-field data member is made.

If overlap is allowed, then, as shown by step 507, the starting bit of the bit-field container (BFC_START) is established as the smallest beginning bit of a byte that will still allow the next available free bit to be contained within the bit-field container. However, the starting bit of the bit-field container cannot be less than zero, i.e., the first bit of memory allocated to the data structure. This positioning of the starting bit of the bit-field container is accomplished by the expression Max (0, ((Int(NAFB/8)−Int(BFC_SIZE/8)+1)*8)), as shown in step 507.

If overlap is not allowed, then the location of the starting bit of the bit-field container depends upon whether the previously allocated data member was a bit-field data member, i.e., a determination is made as to whether there is a previous bit-field container (PBFC), as shown by step 508. Note that, though the user specified no overlap, in order to accommodate standard expectations regarding data structure layout, overlap will still be allowed if the bit-field containers of successive bit-field members are the same size (see step 511 below).

If there is not a previous bit-field container, then the starting bit of the bit-field container is set equal to the next available free bit, as shown by step 509. In other words, if the previously allocated data member was a non-bit-field data member, then there is no previous bit-field container and, thus, no unused (but allocated) bits that the current data member could use.

However, if there is a previous bit-field container, i.e., the previously allocated data member was a bit-field data member, then the starting bit of the current bit-field container must be located so that the current bit-field container does not overlap with the previous bit-field container. To this end, a determination is made as to whether the size (BFC_SIZE) of the current bit-field container is equal to the size (PFBC_SIZE) of the previous bit-field container, as shown by step 510.

If the size of the current bit-field container is equal to the size of the previous bit-field container, then the starting bit of the current bit-field container (BFC_START) is set equal to the starting bit of the previous bit-field container (PBFC_START), as shown by step 511.

If the size of the current bit-field container is not equal to the size of the previous bit-field container, then, in step 512, the process PROCESS_FILL_PBFC is called to "fill" the previous bit-field container, i.e., allocate the unused bits in the previous bit-field container. The steps in PROCESS_FILL_PBFC are explained in more detail above with respect to FIG. 4. After the previous bit-field container is filled, upon return to the process PROCESS_BIT_FIELD (FIG. 5A), the starting bit of the bit-field container is set equal to the next available free bit.

In steps 506 through 512, discussed above, the starting bit of the bit-field container, i.e., the location of the bit-field container, is tentatively determined. In step 513, the starting bit of the bit-field container is aligned to the next highest bit that satisfies the bit-field container alignment requirement (BFC_ALIGN) that was determined above in step 504 or 505a. This is done to ensure that the memory allocation for the bit-field data member will conform to the associated alignment requirement.

Next, as shown by step 514, a determination is made as to whether the next available free bit (NAFB) is less than the starting bit of the bit-field container (BRC_START). If so, then the next available free bit is set equal to the starting bit of the bit-field container, as shown by step 515. Since the previous steps may have resulted in movement of the starting bit of the bit-field container beyond the next available free bit, this is necessary to ensure that the memory allocation of the bit-field data member (the beginning of which is marked by the next available free bit) does not begin before the bit-field container or, in other words, begins within the bit-field container.

In step 516, the member offset (MEMBER_OFFSET) of the bit-field data member is set equal to the next available free bit. However, this is only a tentative specification of the member offset since several conditions (discussed below) must not be violated by this memory allocation.

First, the memory allocation for the bit-field data member must not extend outside of the bit-field container. This is tested in step 517, in which a determination is made as to whether the ending bit of the bit-field data member is greater than the ending bit of the bit-field container. The ending bit (MEMBER_END) of the bit-field data member is equal to the member offset (MEMBER_OFFSET) plus the member size (MEMBER_SIZE) minus 1. The ending bit (BFC_END) of the bit-field data member is equal to the starting bit (BFC_START) of the bit-field container plus the bit-field container size (BFC_SIZE) minus 1. If the ending bit of the bit-field data member is greater than the ending bit of the bit-field container, then the starting bit of the bit-field container must be modified, i.e., the bit-field container must be moved, so that this no longer occurs. This is done in steps 518 through 521.

In step 518, the starting bit of the bit-field container (BFC_START) is incremented by the bit-field container increment (BFC_INCR), thereby also incrementing the ending bit of the bit-field container. The amount of the bit-field container increment is a user-specified parameter: specification of a structure as packed causes the bit-field container increment to be equal to 1, while specification of a structure as unpacked necessitates that the user more explicitly specify the bit-field container increment, as described above with respect to steps 505b, 505c and 505d.

In step 519, a determination is made as to whether the data structure is packed or unpacked. If the data structure is packed, then the ending bit of the bit-field data member is again compared to the ending bit of the bit-field container to determine which is greater (step 517). If the data structure is unpacked, then, in step 520, a determination is made as to whether the starting bit of the bit-field container is greater than the next available free bit. If the starting bit of the bit-field container is greater than the next available free bit, then, the next available free bit is set equal to the starting bit of the bit-field container, as shown by step 521. (Steps 520 and 521 accomplish the same objective as steps 514 and 515 above.) In either case, the ending bit of the bit-field data member is again compared to the ending bit of the bit-field container to determine which is greater (step 517).

The steps 518 through 521 are performed as many times as is necessary to move the starting bit of the bit-field container so that the ending bit of the bit-field data member does not extend beyond the ending bit of the bit-field container, i.e., the move the bit-field container so that the bit-field data member is entirely within the bit-field container.

When this condition is finally satisfied, then, in step 522, a determination is made as to whether the existing memory allocation of the bit-field data member results in complex straddling. Two conditions must be satisfied for complex straddling to exist. First, the bit-field data member must straddle more than one bit-field container, i.e., the starting bit of the bit-field container must be greater than the next available free bit. Second, the size of the bit-field data member must be greater than the established word size, i.e., $((MEMBER\_END+7)/8)-((NAFB+7)/8)>WORD\_SIZE$. Complex straddling is always avoided because accessing such data is slow and complicated: two word accesses and several instructions are required to access the data.

If complex straddling exists, then the next available free bit is set equal to the starting bit of the bit-field container, as shown by step 523, thus eliminating the first condition for the presence of complex straddling.

It is possible for allocation of memory for a bit-field data member to be done entirely within a previous bit-field container. If so, it is not necessary to change the values of the variables describing the previous bit-field container, i.e., PBFC_START, PBFC_SIZE, PBFC_END. Steps 524 and 525 reset the values of the previous bit-field container variables as necessary. In step 524, a determination is made as to whether the ending bit of the previous bit-field container is less than the ending bit of the current bit-field container. If the ending bit of the previous bit-field container is less than the ending bit of the current bit-field container, then the values of the previous bit-field container variables must be updated and, in step 525, the starting bit of the previous bit-field container is set equal to the starting bit of the current bit-field container and the size of the previous bit-field container is set equal to the size of the current bit-field container. The ending bit of the previous bit-field container, equal to the starting bit of the previous bit-field container plus the size of the previous bit-field container, also becomes equal to the ending bit of the current bit-field container. If the ending bit of the previous bit-field container is greater than the ending bit of the current bit-field container, then the values of the previous bit-field container variables do not need to be updated and remain the same. In any event, at this point, the layout method returns to the main process, PROCESS_STRUCT_LAYOUT (FIG. 2), as shown by step 526.

As seen in FIG. 2, after all the data members of a data structure have been processed, as determined in step 203, a determination is made as to whether bit-field containers reserve space or not, as shown by step 209. If bit-field containers do reserve space, then the process PROCESS__FILL__PBFC is called, as shown by step 210, to "fill" a previous bit-field container, if any. The steps in PROCESS__FILL__PBFC are explained in more detail above with respect to FIG. 4. Reservation of space by bit-field containers is a user-specified option. This gives the user the option of reducing the size of the data structure or laying out the data structure according to an external constraint such as may be imposed by an external device register.

Whether or not the last bit-field container is filled, in step 211, the next available free bit (NAFB) is aligned to the next highest bit that satisfies the structure alignment requirement (STRUCT__ALIGN). The size of the data structure (STRUCT__SIZE) is then established as the value of the next available free bit. Step 211 ensures that the size of the structure is a multiple of the structure alignment requirement. This is done to ensure that, if the data structure is included in an array of other similar data structures, each of the data structures in the array will be properly aligned, i.e., conform to the structure alignment requirement.

At this point, the data structure layout is complete, as shown by step 212, and is defined by the output of the layout method of the invention. The output includes the size of the data structure, the structure alignment, and the member offset for each of the data members in the data structure. In other words, memory has been allocated for each of the data members in the data structure.

Above, packing of data structures was discussed. As seen above, a user-specified parameter can be used to specify whether a data structure is packed or not. In object-oriented programming languages such as C++, a data structure (e.g., a class) can be part of a hierarchically related set of data structures. According to the invention it is possible to pack a data structure at any level of the hierarchy. This can be specified, for example, by appropriate declaration of the data structure in the program.

Figure 8:
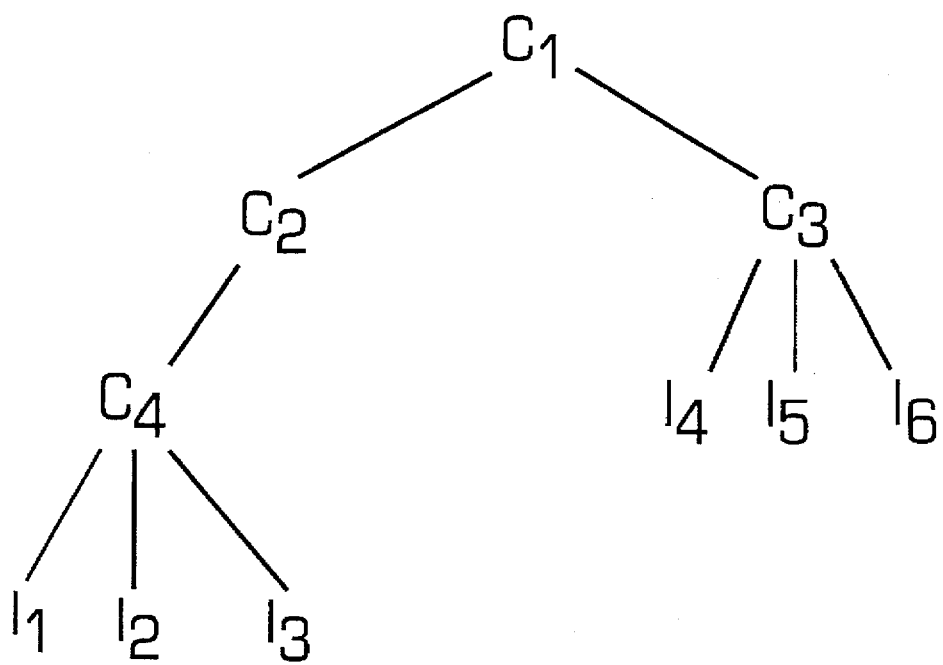
FIG. 8 is a diagram illustrating a class hierarchy in an object-oriented programming language that illustrates a hierarchical data structure to which the invention can be applied.

FIG. 8 is a diagram illustrating a class hierarchy in an object-oriented programming language. A class $C_4$ has instances $I_1$, $I_2$ and $I_3$ and also has a parent class $C_2$, which, in turn, has a parent class $C_1$. Each of the classes $C_1$, $C_2$ and $C_4$ include a definition of one or more data members. According to the invention, each of the classes $C_1$, $C_2$ and $C_4$ can be specified as packed or unpacked, independent of whether any of the other classes are packed or unpacked. Only the data members defined in each class are subject to the packing specification for that class.

According to the invention, data structure layout for a hierarchically related set of data structures, e.g., a parent class and a child class, would be accomplished as follows. First, a data structure layout for the parent class would be determined according to the methods described above in FIGS. 2, 3, 4, 5A and 5B. Memory would be allocated for each of the data members defined in the parent class. Then, a data structure layout would be determined for the child class, again using the methods described above with respect to FIGS. 2, 3, 4, 5A and 5B. In the same manner as for the parent class, memory would be allocated for each of the data members defined in the child class. Additionally, the parent class for which a data structure layout was previously determined would be considered to be a data member of the child class. This data member would be processed according to the methods of the invention as any other data member in the child class.

Below are examples, written in C++, illustrating the data structure sizes that result from various packing specification combinations for two hierarchically related structures ("struct"). In these examples, the packing specification is made by specifying "packed" or "unpacked" before the struct declaration. The examples illustrate that the base struct can be packed and the derived struct unpacked, the base struct can be unpacked and the derived struct packed, both the base struct and derived struct can be packed, both the base struct and derived struct can be unpacked. The structure sizes and member offsets shown in the comments of the example are given in bytes. The following initializations are also assumed: minimum structure alignment for unpacked and packed structures is 1, and the alignment requirement of data members larger than or equal to four bytes is equal to four bytes. The following is a packed struct. The size of the data structure is 5 bytes: "c" begins at byte 0 and extends to byte 1, and "i" begins at byte 1 and extends to byte 5.

```
packed struct packed_base_struct {
    char c;
    int i;
};
```

The following is an unpacked struct. The size of the data structure is 8 bytes: "c" begins at byte 0 and extends to byte 4, and "i" begins at byte 4 and to byte 8.

```
unpacked struct unpacked_base_struct {
    char c;
    int i;
};
```

The following is a packed struct derived from the above packed base struct. The size of the data structure is 10 bytes: "c" begins at byte 0 and extends to byte 1, "i" begins at byte 1 and extends to byte 5, "c1" begins at byte 5 and extends to byte 6, "i1" begins at byte 6 and extends to byte 10.

```
packed struct packed_derived_struct1:
    public packed_base_struct {
    char c1;
    int i1;
};
```

The following is a packed struct derived from the above unpacked base struct. The size of the data structure is 13 bytes: "c" begins at byte 0 and extends to byte 4, "i" begins at byte 4 and extends to byte 8, "c1" begins at byte 8 and extends to byte 9, "i1" begins at byte 9 and extends to byte 13.

```
packed struct packed_derived_struct2:
    public unpacked_base_struct {
    char c1;
    int i1;
};
```

The following is an unpacked struct derived from the above unpacked base struct. The size of the data structure is 16 bytes: "c" begins at byte 0 and extends to byte 4, "i" begins at byte 4 and extends to byte 8, "c1" begins at byte 8 and extends to byte 12, "i1" begins at byte 12 and extends to byte 16.

```
unpacked struct unpacked_derived_struct1:
    public unpacked_base_struct {
    char c1;
    int i1;
};
```

The following is an unpacked struct derived from the above packed base struct. The size of the data structure is 13 bytes: "c" begins at byte 0 and extends to byte 1, "i" begins at byte 1 and extends to byte 5, "c1" begins at byte 5 and extends to byte 9, "i1" begins at byte 9 and extends to byte 13.

```
unpacked struct unpacked_derived_struct2:
    public packed_base_struct {
    char cl;
    int i1;
};
```

The examples show only one-level of inheritance. However, this could be extended to multiple levels of inheritance. Further, the examples show only single inheritance. However, the concept can be extended for multiple inheritance as well. (Multiple inheritance occurs when a struct is derived from more than one base struct.)

Thus, according to the invention, maximum flexibility can be achieved in packing hierarchically related data structures. First, the user can control whether or not each data structure of a set of data structures having a hierarchical relationship are packed or not. Second, for each data structure that is packed, the degree of packing within the data structure can be controlled by appropriate specification of a user-specified parameter, as described above.

As discussed above, a user can specify several predefined parameters to control certain characteristics of the data structure layout. Generally, the parameters control the density of the memory allocations for the data members. The user can specify any combination of parameters ranging from a combination that maximizes the density of the memory allocations (space optimizing data structure layout) to a combination that makes the memory allocations so as to maximize the sets of external constraints with which the data structure layout is compatible (compatibility maximization data structure layout). With proper specification of the parameters, a user can achieve a data structure layout that provides a desired combination of program execution speed (i.e., compatibility with external constraints) and required memory capacity (i.e., space minimization).

Various embodiments of the invention have been described. The descriptions are intended to be illustrative, not limitative. Thus, it will be apparent to one skilled in the art that certain modifications may be made to the invention as described without departing from the scope of the claims set out below. In the embodiments above, the invention is described as applicable to layout of data structures for use with the C and C++ programming languages. However, the invention is applicable to layout of data structures for use with other programming languages such as objective-C, Eiffel and Pascal.

We claim:

1. A method for laying out data members of a data structure, the data members including bit-field data members, the method comprising the steps of:

accepting as input i) an identifier of each data member, ii) a data type for each data member, and iii) a data type size for each data member;

accepting as input the value of a parameter specified by a user, the parameter indicating, if the structure is an unpacked structure, an increment that defines where a new allocation unit for a bit-field data member will start relative to the allocation unit for the previous data member, the increment being equal to the bit-field alignment requirement;

sequentially determining a member offset for each of the data members, wherein:
   the determination of the member offset of each data member is dependent upon whether the data member is a bit-field data member or not; and
   the determination of one or more of the member offsets is dependent upon the value of the parameter; and determining a size of the data structure.

2. A method for laying out data members of a data structure, the data members including bit-field data members, the method comprising the steps of:

accepting as input i) an identifier of each data member, ii) a data type for each data member, and iii) a data type size for each data member;

accepting as input the value of a parameter specified by a user, the parameter indicating, if the structure is an unpacked structure, an increment that defines where a new allocation unit for a bit-field data member will start relative to the allocation unit for the previous data member, the increment being equal to the size of the previous allocation unit;

sequentially determining a member offset for each of the data members, wherein:
   the determination of the member offset of each data member is dependent upon whether the data member is a bit-field data member or not; and
   the determination of one or more of the member offsets is dependent upon the value of the parameter; and determining a size of the data structure.

* * * * *